UNITED STATES PATENT OFFICE.

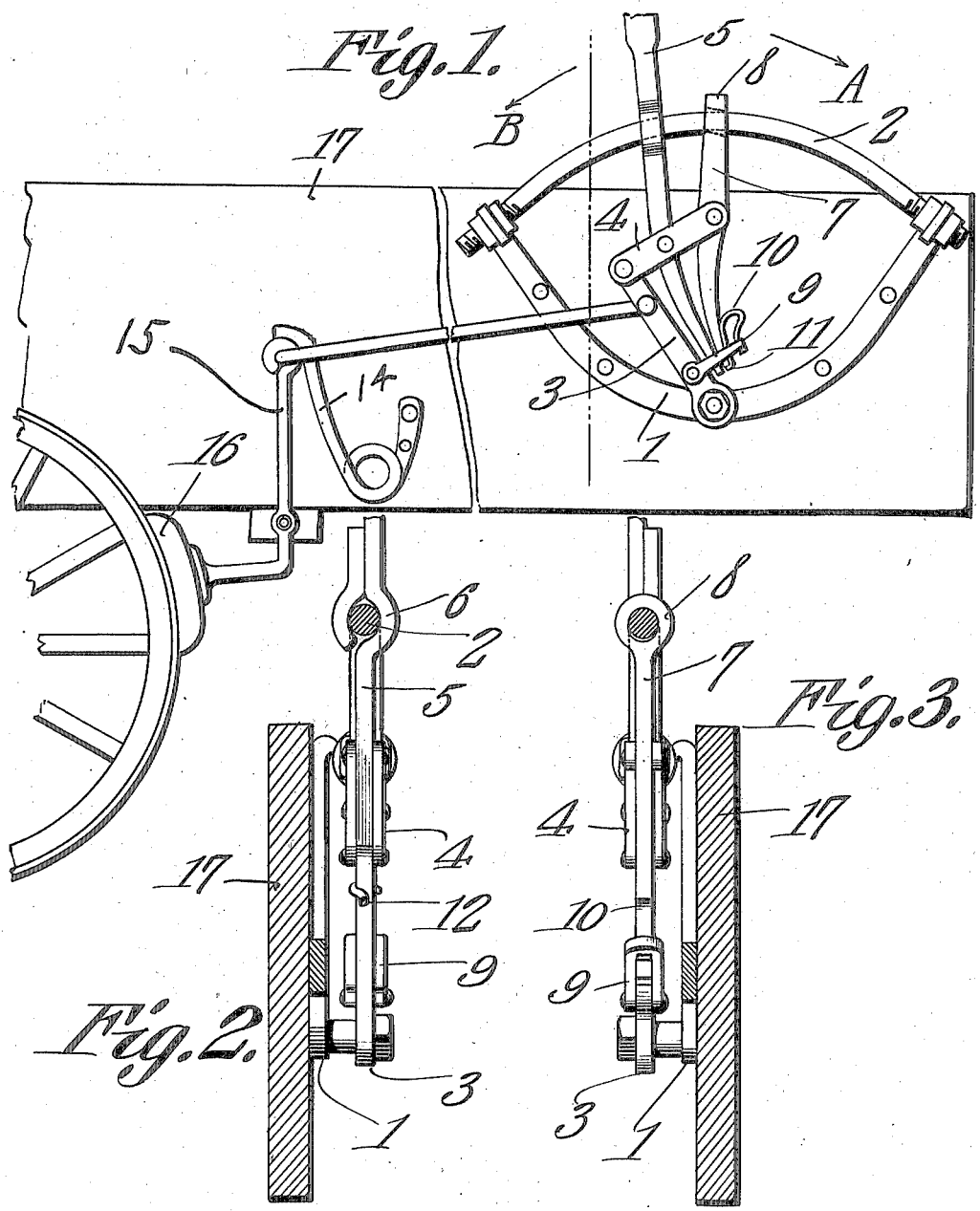

JOSEPH M. CUSTER, OF COPPER HILL, VIRGINIA.

VEHICLE-BRAKE LEVER.

948,106.  Specification of Letters Patent.  Patented Feb. 1, 1910.

Application filed August 30, 1909. Serial No. 515,278.

*To all whom it may concern:*

Be it known that I, JOSEPH M. CUSTER, a citizen of the United States, residing at Copper Hill, in the county of Floyd and State of Virginia, have invented a new and useful Vehicle-Brake Lever, of which the following is a specification.

It is the object of this invention to provide a brake lever adapted to be mounted upon vehicles to set the brakes thereof, novel means being provided for locking the lever in predetermined position.

With these and other objects in view, the invention consists in certain novel features of construction which are delineated in the accompanying drawings and particularly pointed out in that portion of this instrument wherein patentable novelty is claimed, it being understood that the drawings illustrate but one form of the invention, and that changes, properly falling within the scope of what is claimed, may be made, without departing from the spirit or sacrificing any of the advantages of the invention.

Similar numerals of reference are employed to denote corresponding parts throughout the several figures of the drawings, in which, Figure 1 is a side elevation and Figs. 2 and 3 transverse sections upon opposite sides of the operating lever.

In the accompanying drawings, the numeral 17 denotes generally the body of a vehicle, upon which is mounted a frame comprising a base portion 1, the extremities of which are connected by an upwardly convexing arm 2. Pivoted at its lower end to the base 1 of the frame and terminating below the arm 2, is an auxiliary lever 3. Mounted upon the auxiliary lever 3, adjacent the upper end thereof, are spaced plates 4, between which is interposed an operating lever 5 arranged to extend above the arm 2 and pivoted, intermediate its ends, between the plates 4, the operating lever being enlarged in any suitable manner, as denoted by the numeral 6, to inclose the arm 2.

A grip 7 is provided, the same consisting of a rigid bar, provided at its upper end with a head 8, adapted to slide upon the arm 2. The opening through the head 8 is somewhat larger in diameter than the arm 2, so that the grip may be tilted to cause the head 8 to engage frictionally, and to bind upon the arm 2. The intermediate portion of the grip 7 is pivotally assembled with the plates 4 upon the opposite side of the operating lever 5 from the auxiliary lever 3, the lower extremities of the grip 7 and of the operating lever 5 being tapered and inclosed within a U-shaped shoulder 9, the ends of which are connected with the auxiliary lever 3. A U-shaped spring 10 is introduced between the end of the shoulder 9 and the lower end of the grip 7, the spring 10 being compressible by the grip 7, and normally bearing against the lower end thereof. As denoted by the numeral 11, the extremities of the spring 10 are oppositely bent to engage the end of the shoulder 9 and to engage the lower extremity of the grip 7, whereby the said spring 10 is held in position within the shoulder 9.

One end of a rod 12 is pivotally connected with the auxiliary lever 3 between the plates 4 and the shoulder 9, the other end of the rod 12 being pivoted to the upper extremity of an upright brake beam 15, having at its lower end a brake shoe 16 adapted to engage the wheel of the vehicle, the brake beam being pivoted between its ends, in any suitable manner upon the body 17 of the vehicle. If desired, a coiled spring 14 may be provided, one end of which is mounted upon the wagon body 17, the other end thereof being preferably connected with the pivotal union between the rod 12 and the brake beam 15.

The operation of the device is as follows:—
When the upper end of the operating lever 5 moves in the direction of the arrow A, the lower end of the operating lever will bear against the auxiliary lever 3, the plates 4 causing the head 8 of the grip 7 to slide along the arm 2. It is obvious that as the head 8 slides along the arm 2, the friction between the head and the arm tends to tilt the upper end of the grip 7 in the direction of the arrow B and were this tilting to be permitted, the operating lever 5 would be immediately locked, the setting of the brake shoe 16 being rendered impossible. In order to overcome this difficulty, the spring 10 is provided, which, bearing against the lower extremity of the grip 7, serves to overcome the friction between the head 8 and the arm 2 when the operating lever 5 is moved in the direction of the arrow A, thereby permitting the head 8 to move smoothly and evenly and without binding, while the brakes are being set. As soon, however, as the movement of the operating lever 5 in the direction of the arrow A is discontinued, the spring 10, bearing against the lower end of the grip 7 will tilt the head 8 and cause the same to bind frictionally upon the arm 2, and to hold the operating lever 5 in the position to which it has been thrown. The foregoing operation will set the brakes, and when it is desired to release the brakes, the operating lever 5 is moved at its upper end in the direction of the arrow B. When thus moved, the lower end of the operating lever will engage the lower end of the grip 7 compressing the spring 10 and tilting the head 8 so that the same may readily slide in the direction of the arrow B upon the arm 2. This sliding of the head 8 upon the arm 2 to release the brake is facilitated by the action of the spring 14, which, when the lower end of the operating lever 5 is in contact with the lower end of the grip 7, to break the hold between the head 8 and the arm 2, serves to draw the operating lever 5 in the direction of the arrow B. When however, the brakes have been set, the action of the spring 14, drawing upon the auxiliary lever 3, tends to augment the action of the spring 10, tilting the head 8 of the grip 7 to engage the arm 2.

Having described my invention, what I claim as new and desire to protect by Letters Patent is:—

1. A device of the class described comprising a frame having an arcuate arm; an auxiliary lever pivoted to the lower portion of the frame and terminating below the arm; a grip arranged at its upper end to bear frictionally upon the arm; a connection between the intermediate portion of the grip and the auxiliary lever; an operating lever located between the grip and the auxiliary lever and pivoted intermediate its ends to the connection; the lower end of the grip being engageable by the lower end of the operating lever to break the frictional hold of the grip upon the arm.

2. A device of the class described comprising a frame having an arcuate arm; an auxiliary lever pivoted to the lower portion of the frame and terminating below the arm; a grip arranged at its upper end to bear frictionally upon the arm; a connection uniting the intermediate portion of the grip with the auxiliary lever; an operating lever located between the grip and the auxiliary lever and pivotally assembled with the connection; resilient means engaging the lower end of the grip to tilt the same to bind upon the arm; the lower end of the grip being engageable by the lower end of the lever to overcome the action of the resilient means.

3. A device of the class described comprising a frame having an arcuate arm; an auxiliary lever pivoted to the lower portion of the frame and terminating below the arm; a grip having its upper end arranged to bear frictionally upon the arm; a connection uniting the intermediate portion of the grip with the auxiliary lever; an operating lever located between the grip and the auxiliary lever and pivotally assembled with the connection; a shoulder projecting from the auxiliary lever; resilient means carried by the shoulder and engageable by the lower end of the grip to tilt the same into binding contact with the arm; the lower end of the grip being engageable by the lower end of the lever to overcome the action of the resilient means.

4. A device of the class described comprising a frame having an arcuate arm; an auxiliary lever pivoted to the lower portion of the frame and terminating below the arm; a grip arranged at one end to bear frictionally upon the arm; a connection uniting the intermediate portion of the grip with the auxiliary lever; an operating lever located between the grip and the auxiliary lever and pivoted intermediate its ends to the connection; a shoulder projecting from the auxiliary lever and arranged to inclose the lower extremities of the grip and the operating lever; a bent spring having its ends inclosed by the shoulder and arranged to bear against the shoulder and the lower extremity of the grip; the lower end of the grip being engageable by the lower end of the lever to overcome the action of the spring.

In testimony that I claim the foregoing as my own, I have hereto affixed my signature in the presence of two witnesses.

JOSEPH M. CUSTER.

Witnesses:
W. L. REED,
H. H. PAFF.